2,814,592

PROCESSES FOR PURIFYING INORGANIC MATERIALS

George H. Morrison, Westbury, and Richard L. Rupp, New York, N. Y., assignors to Sylvania Electric Products Inc., a corporation of Massachusetts No Drawing. Application November 23, 1956, Serial No. 623,807

4 Claims. (Cl. 204—140)

Our invention relates to processes for purifying inorganic materials.

It is an object of our invention to improve processes for purifying elements selected from the class composed of metals and metallic oxides dissolvable in alkaline media.

Another object is to derive from metal or metallic oxides dissolvable in alkaline media the appropriate metallic oxide of the starting material in highly purified form.

Still another object is to improve methods for purifying metallic oxides through selective separation and removal therefrom of cationic and anionic impurities.

Yet another object is to remove trace impurities from certain metals and metallic oxides without introducing additional impurities.

These and other objects of our invention will either be explained or will become apparent hereinafter.

In accordance with the principles of our invention, a starting material selected from the class composed of silicon, germanium, aluminum, zinc, tungsten and their oxides, is dissolved in alkaline media and a solution is formed. The cations of said media are then separated from the solution in an electrolytic cell utilizing a single permselective membrane. After removal of these cations, the solution is evaporated to form a solid. The solid is treated with an appropriate solvent to extract impurities from the solid and thus produce the final product. When the starting material is a metal, the final product is a purified oxide of this metal; when the starting material is an oxide, the final product remains in the form of the oxide but in highly purified form.

Our invention will now be described in detail with reference to the examples which follow.

*Example I*

Pure silicon containing trace amounts (on the order of parts per million) of phosphorous, copper, boron and other impurities, was fully dissolved in a sodium hydroxide solution.

The solution containing dissolved silicon was then poured into a first compartment of a two compartment polyethylene cell. In this cell, the two compartments were separated by a cation permeable ion-exchange membrane, and further each compartment contained a platinum electrode. A sodium hydroxide solution having a concentration sufficient to establish high electrical conductivity was poured into the second compartment of the cell. With the electrode in the first compartment functioning as an anode, a direct voltage was applied between the electrodes. Under the influence of this voltage, sodium cations in the first compartment were caused to migrate through the membrane into the second compartment. The electrolytic action was continued until the pH of the solution in the first compartment indicated slight alkalinity, i. e. a pH of about 8.

The solution in the first compartment, after transfer from the cell to a platinum dish, was evaporated to dryness by being heated in air to a temperature of about 110° C., a solid crystalline deposit being formed. This deposit was washed several times with pure water.

The washed deposit was then redissolved in a minimum amount of sodium hydroxide; the redissolved solution was then placed in the polyethylene cell and the electrolysis operation previously described was repeated, the separation action being continued until the pH of the redissolved solution approached a neutral pH (i. e. a pH of about 7). Sufficient hydrochloric acid was then added to the solution to render it acidic, in this example the pH being adjusted to 2. The solution was then evaporated to dryness, and the solid thus produced was washed several times with pure water to produce the final product, hydrated silicon oxide. This product was analyzed using radioactive tracers and a spectrograph. It was found that substantially all the trace impurities had been removed.

We have found that the above process removes impurities in the following manner. First, the electrolysis step extracts sodium ions and also extracts a major portion of the monovalent cation impurities. Secondly, since the evaporated solid first produced is somewhat alkaline, the pure water or other appropriate solvent used in the immediately subsequent washing step removes the anion impurities. Thirdly, since the evaporated solid produced during the recycling operation is acidic, the final washing removes the remaining cation impurities.

The efficiency of this process is optimized by separately removing the anion and cation impurities in the manner described above. However, if desired, the electrolytic action can be continued until the pH of the solution containing dissolved silicon approaches a neutral pH, in which case only one washing step need be used; under these conditions impurities will still be removed but in a less efficient manner.

*Example II*

The process of Example I was successively repeated, using germanium, zinc, aluminum, germanium dioxide, zinc oxide, aluminum oxide and tungstic acid (potassium hydroxide being used as a solvent). As before, the corresponding oxide products, when analyzed, were found be highly purified.

*Example III*

Commercially pure tungsten was dissolved in sodium carbonate by fusing these two materials together in a crucible at a temperature of 950° C. The melt was then dissolved in pure water. The dissolved melt was then processed in the manner outlined in Example I; substantially the same results were obtained.

While we have shown and pointed out our invention as applied above, it will be apparent to those skilled in the art that many modifications can be made within the scope and sphere of our invention as defined in the claims which follow.

What is claimed is:

1. A method for removing trace impurities from a material selected from the class composed of silicon, germanium, aluminum, zinc, tungsten and their oxides which comprises the steps of dissolving said material in alkaline media and forming a first solution; separating alkaline cations and a major portion of the monovalent cation impurities from said first solution in an electrolytic cell utilizing a single permselective membrane, thereby forming a second solution; evaporating said second solution to form a first solid; washing said first solid with a solvent to remove the anion trace impurities therefrom; redissolving said first solid in alkaline media and forming a third solution; separating alkaline cations and a major portion of the remaining monovalent cation impurities from said third solution in an electrolytic cell utilizing a single permselective membrane thereby forming a fourth solution; evaporating said fourth solution to form a second solid; and washing said second solid with a solvent to remove the cation trace impurities and thereby producing a pure oxide of said material.

2. In a method for purifying a material selected from the class composed of silicon, germanium, aluminum, zinc, tungsten and their oxides, the steps of dissolving said material in alkaline media and forming a first solution; separating alkaline cations from said first solution in an electrolytic cell utilizing a single permselective membrane to form a second solution; evaporating said second solution to form a first solid; removing anion impurities from said first solid; dissolving said first solid in alkaline media and forming a third solution; separating alkaline cations from said third solution in an electrolytic cell utilizing a single permselective membrane to form a fourth solution; evaporating said fourth solution to form a second solid; and extracting cation impurities from said second solid.

3. A method for purifying a material selected from the class composed of silicon, germanium, aluminum, zinc, tungsten and their oxides, the steps of dissolving said material in alkaline media and forming a first solution; separating cations of said media from said first solution in an electrolytic cell utilizing a single permselective membrane thereby forming a second solution; evaporating said second solution to form a solid; and extracting cation and anion impurities from said solid.

4. A method for removing trace impurities from a material selected from the class composed of silicon, germanium, aluminum, zinc, tungsten and their oxides which comprises the steps of dissolving said material in alkaline media and forming a first solution; separating alkaline cations and a major portion of the monovalent cation impurities from said first solution in an electrolytic cell utilizing a single permselective membrane, thereby forming a second solution, the electrolytic action being continued until the pH of the second solution is slightly alkaline; evaporating said second solution to form a first solid; washing said first solid with a solvent to remove the anion trace impurities therefrom; redissolving said anion impurity from said solid in alkaline media and forming a third solution; separating alkaline cations and a major portion of the remaining monovalent cation impurities from said third solution in an electrolytic cell utilizing a single permselective membrane to form a fourth solution; adjusting the pH of said fourth solution to render same acidic; evaporating the pH adjusted fourth solution to form a second solid; and washing said second solid with a solvent to remove the cation trace impurities and thereby producing a pure oxide of said material.

References Cited in the file of this patent
UNITED STATES PATENTS 2,723,229    Bodamer _____ Nov. 8, 1955